United States Patent Office 3,574,188
Patented Apr. 6, 1971

3,574,188
PROCESS FOR PREPARING CARBOXYMETHYL CELLULOSE OR ITS ALKALI SALT OF HIGH VISCOSITY
Kikuo Takehara, Kyoto-shi, Hisakazu Senda, Kuze-gun, and Kazuhiro Hirano, Kyoto-shi, Japan, assignors to Dai-Ichi Kogyo Seiyaku Co., Ltd.
No Drawing. Filed Feb. 27, 1970, Ser. No. 15,196
Int. Cl. C08b 11/00
U.S. Cl. 260—231                                    5 Claims

ABSTRACT OF THE DISCLOSURE

Cellulose or alkali cellulose is treated with trichloro acetic acid or an alkali salt thereof.

The present invention relates to a process for preparing carboxymethyl cellulose or its alkali salt (hereinafter referred to as "CMC"). More particularly, it relates to a process for preparing CMC of high viscosity at a low cost with ease.

For the production of CMC of high viscosity, there have heretofore been provided a number of procedures, of which typical ones are as follows: regulating appropriately the reaction conditions in production of alkali cellulose, using in combination monochloroacetic acid and dichloroacetic acid as the etherifying agent, heating CMC in wet state with monochloroacetic acid to dryness, etc. All of these known procedures have, however, some drawbacks. For instance, the reaction is apt to proceed unevenly due to high crystallinity. Further, for instance, even careful regulation of the reaction conditions cannot completely avoid decomposition or fission of the molecular linkage. In addition, the viscosity of the resulting product is much decreased with elapse of time. Further, for instance, the combined use of monochloroacetic acid and dichloroacetic acid is defective in expensiveness of the latter reagent and insufficiency of the viscosity increasing effect. Furthermore, for instance, heating of wet CMC with monochloroacetic acid requires complex operation and careful regulation of pH.

As the result of the study on the production of CMC of high viscosity with industrial advantages, it has been found that the execution of treatment with trichloroacetic acid or its alkali salt in the production of CMC provides the resulting product with high viscosity. Trichloroacetic acid and its alkali salt are available at low costs and may be used in small amounts in the said treatment. The resulting CMC has high viscosity and is of excellent quality. The present invention is based on the above finding.

According to this invention, CMC of high viscosity is produced by effecting the treatment with trichloroacetic acid or its alkali salt prior to, simultaneously with or subsequent to etherification of cellulose or alkali cellulose with monochloroacetic acid or its alkali salt in a liquid medium. In other words, cellulose, alkali cellulose or carboxymethyl cellulose or its alkali salt may be treated with trichloroacetic acid or its alkali salt in a liquid medium so as to obtain CMC of high viscosity.

As the starting cellulose, there may be used wood pulp, linter pulp or the like, favorably pulverized in 20 to 100 mesh. Such material may be previously converted into alkali cellulose by treatment with alkali such as alkali hydroxide (e.g. sodium hydroxide, potassium hydroxide). Further, these materials may be converted into carboxymethyl cellulose or its alkali salt by treatment with monochloroacetic acid or its alkali salt prior to the treatment of this invention.

Examples of the alkali salt of trichloroacetic acid are sodium salt, potassium salt, ammonium salt, etc.

The treatment with trichloroacetic acid or its alkali salt is normally carried out simultaneously with or subsequent to treatment with monochloroacetic acid or its alkali salt. Thus, cellulose or alkali cellulose is treated with a mixture of monochloroacetic acid or its alkali salt and trichloroacetic acid or its alkali salt in a liquid medium. Or, cellulose or alkali cellulose is first etherified with monochloroacetic acid or its alkali salt and then the resulting product is treated with trichloroacetic acid or its alkali salt in a liquid medium. In these treatments, any other etherifying agent such as dichloroacetic acid or its alkali salt may be present.

The amount of trichloroacetic acid or its alkali salt to be employed may be from 0.005 to 0.1 mol, preferably from 0.01 to 0.05 mol, per anhydroglucose unit of the cellulose molecule. When the amount is less than the said lower limit, the viscosity of the resulting CMC is not sufficient. In the case that the amount is more than the upper limit, the produced CMC is insoluble or forms gel in swelling state when treated with water.

Examples of the solvent for the liquid medium are water, aliphatic alcohols (e.g. ethanol, n-propanol, isopropanol, n-butanol, isobutanol, sec-butanol, tert-butanol), aromatic hydrocarbons (e.g. benzene, toluene, xylene, ethylbenzene), aliphatic ketones (e.g. acetone) and their mixtures (e.g. acetone-ethanol, isopropanol-ethanol, benzene-ethanol).

Other concrete operations and procedures in the present invention may be effected in the manners conventionally adopted for production of CMC from cellulose or alkali cellulose.

According to the present invention, there is provided CMC of high viscosity by the use of an extremely small amount of trichloroacetic acid. The reason why such CMC is obtained is not sure. Assumably, it is due to formation of the ether bond and/or the intermolecular lactone linkage between cellulose and trichloroacetic acid. The following chemical formulae (taking the treatment of cellulose with sodium trichloroacetate as example) represent examples of the reactions which may take place:

(1)
$$\text{Cell—OH} + \text{Cl}_3\text{CCOONa} \xrightarrow{-\text{HCl}}$$

$$\text{Cell—O—}\underset{\underset{\text{Cl}}{|}}{\overset{\overset{\text{Cl}}{|}}{\text{C}}}\text{—COONa} \xrightarrow[-\text{NaCl}]{+\text{Cell—O—CH}_2\text{COONa}}$$

$$\text{Cell—O—}\underset{\underset{\text{OOCCH}_2\text{O—Cell}}{|}}{\overset{\overset{\text{Cl}}{|}}{\text{C}}}\text{—COONa}$$

(2)
$$\text{Cell—OH} + \text{Cl}_3\text{CCOONa} \xrightarrow{-\text{HCl}}$$

$$\text{Cell—O—}\underset{\underset{\text{Cl}}{|}}{\overset{\overset{\text{Cl}}{|}}{\text{C}}}\text{—COONa} \xrightarrow[-\text{HCl}]{+\text{Cell—OH}}$$

$$\underset{\text{Cell—O}}{\overset{\text{Cell—O}}{\diagdown}}\underset{\underset{\text{Cl}}{|}}{\text{C—COONa}} \xrightarrow[-\text{HCl}]{+\text{Cell—OH}} \underset{\text{Cell—O}}{\overset{\text{Cell—O}}{\diagdown}}\text{C—COONa}$$

wherein "Cell" represents the residue of cellulose excluding hydroxyl therefrom.

The process of this invention is applicable not only to the so-called "dough" process in which the etherification of cellulose is carried out in the heterogeneous system of solid phase in water but also to the so-called "slurry" process in which the etherification is effected in the slurry state in a mixture consisting of water and at least one of organic solvents. Particularly when applied to the latter process, the treatment with trichloroacetic acid or its alkali salt may be carried out while eliminating partly or wholly from the reaction system so as to obtain CMC of higher viscosity. For instance, the mixture after incorporation of trichloroacetic acid or its alkali salt therein is gradually heated up to a temperature not less than the boiling point of the liquid medium to eliminate 20 to 100% of the liquid medium, during which the etherification is completed.

The CMC obtained by the present invention possesses a high viscosity, particularly when the treatment with trichloroacetic acid or its alkali salt is made during elimination of the liquid medium. In any case, the produced CMC is slightly increased in thyxotropy with affording no material influence on the practical utility.

Practical and presently preferred embodiments of the present invention are shown in the following examples wherein:

(1) Part and percent are by weight;
(2) DS is the number of mols of the introduced carboxymethyl group per anhydroglucose unit of the cellulose molecule; and
(3) The amounts of trichloroacetic acid, dichloroacetic acid, monochloroacetic acid and sodium hydroxide are for their pure components and the impurity in the starting pulp is water.

EXAMPLE 1

In a reactor, 240 parts of 95.0% ethanol and 80 parts of benzene are charged, and 100 parts of wood pulp of 90% purity are added thereto. The resultant mixture is agitated at 25° C. for 5 minutes. A solution of 45.0 parts of sodium hydroxide in 80 parts of water is added to the said mixture in 5 minutes, and agitation is continued at 25 to 30° C. for 40 minutes. While maintaining at 30 to 50° C., 48.5 parts of monochloroacetic acid in solid are added to the resulting slurry in 30 minutes, and the temperature is raised up to 65° C. so that etherification proceeds. After 1 hour, 5 parts of trichloroacetic acid in solid are added thereto in about 1 minute, and the reaction is continued for further 1 hour. The reaction product is neutralized with acetic acid, washed with 80% methanol three times and dried. The thus obtained CMC has the physical properties as shown in Table 1 where those of CMC obtained by treatment as above but using no trichloroacetic acid and of CMC obtained by treatment as above but using 3.95 parts of dichloroacetic acid in place of 5 parts of trichloroacetic acid are also shown.

TABLE 1

| Property | Viscosity [1] | DS | Transparency (mm.) |
| --- | --- | --- | --- |
| Method: | | | |
| Present invention | 1,160 | 0.73 | 250< |
| Trichloroacetic acid not used | 530 | 0.74 | 250< |
| Dichloroacetic acid used | 980 | 0.73 | 250< |

[1] Cps., 1% aqueous solution.

EXAMPLE 2

The etherification is carried out as in Example 1 but using 5 parts of an etherifying agent consisting of 70% of trichloroacetic acid, 20% of dichloroacetic acid and 10% of monochloroacetic acid in place of 5 parts of trichloroacetic acid. The thus obtained CMC has the following physical properties: viscosity (cps., 1% aqueous solution), 1120; DS, 0.73; transparency (mm.), 250<.

EXAMPLE 3

In a reactor, 375 parts of 99.9% isopropanol, 125 parts of water, 100 parts of wood pulp of 90% purity and 60 parts of sodium hydroxide are charged, and the resultant mixture is agitated at 25 to 30° C. for 15 minutes. A solution of 64 parts of monochloroacetic acid in 200 parts of 75% isopropanol is added thereto in 30 minutes. The temperature is raised up to 70° C. so that etherification proceeds. After 60 minutes, 3 parts of trichloroacetic acid in solid are added to the resulting mixture in 1 minute, and the reaction is continued at 70° C. for further 1 hour. The reaction mixture is treated as in Example 1 to give purified CMC, of which the physical properties are shown in Table 2 wherein those of CMC obtained by treatment as above but using no trichloroacetic acid are also shown.

TABLE 2

| Property | Viscosity [1] | DS | Transparency (mm.) |
| --- | --- | --- | --- |
| Method: | | | |
| Present invention | 2,000 | 0.60 | 150 |
| Trichloroacetic acid not used | 1,120 | 0.60 | 160 |

[1] Cps., 1% aqueous solution.

EXAMPLE 4

The etherification is carried out as in Example 1 but raising the slurry temperature up to 80° C. after addition of 5 parts of trichloroacetic acid, during which 200 parts of the reaction solvent are recovered in 30 minutes. The reaction mixture is neutralized with acetic acid, washed with 80% methanol three times and dried. The physical properties of the thus obtained CMC are shown in Table 3 wherein those of CMC obtained by treatment as above but using 3.95 parts of dichloroacetic acid in place of 5 parts of trichloroacetic acid are also shown.

TABLE 3

| Property | Viscosity [1] | DS | Transparency (mm.) |
| --- | --- | --- | --- |
| Method: | | | |
| Present invention | 1,680 | 0.73 | 250< |
| Dichloroacetic acid used | 1,220 | 0.72 | 250< |

[1] Cps., 1% aqueous solution.

EXAMPLE 5

In a reactor, 340 parts of 95.0% ethanol and 120 parts of benzene are charged, and 100 parts of purified wood pulp of 90% purity are added thereto. After stirring for 5 minutes, a solution of 62.5 parts of sodium hydroxide in 120 parts of water is added to the resulting mixture in the reaction mixture is neutralized with acetic acid, washed 60 minutes. Then, 70 parts of monochloroacetic acid in solid are added to the resultant mixture in 30 minutes, and the temperature is raised up to 65° C. so that etherification proceeds. After 2 hours, a solution of 8.5 parts of trichloroacetic acid in 20 parts of 95.0% ethanol is added thereto in about 1 minute, and the temperature is gradually elevated to 65 to 80° C. in 30 minutes, during which 450 parts of the reaction solvent are recovered. The reaction mixture is neutralized with acetic acid, washed with 80% methanol three times and dried. The physical properties of CMC are shown in Table 4 wherein those of CMC obtained by treatment as above but using no ethanolic solution of trichloroacetic acid are also shown.

TABLE 4

| Property | Viscosity [1] | DS | Transparency (mm.) |
| --- | --- | --- | --- |
| Method: | | | |
| Present invention | 3,370 | 0.89 | 250< |
| Trichloroacetic acid not used | 1,210 | 0.92 | 250< |

[1] Cps., 1% aqueous solution.

EXAMPLE 6

The etherification is carried out as in Example 3 but using 880 parts of isopropanol and 120 parts of water in place of 375 parts of isopropanol and 125 parts of water. After the addition of trichloroacetic acid, the temperature is gradually elevated, during which the total amount of the reaction solvent is recovered in 45 minutes. The reaction mixture is treated as in Example 1. The physical properties of the thus obtained CMC are shown in Table 5 wherein those of CMC obtained by treatment as above but using no trichloroacetic acid are also shown.

TABLE 5

| Property | Viscosity[1] | DS | Transparency (mm.) |
|---|---|---|---|
| Method: | | | |
| Present invention | 3,070 | 0.59 | 130 |
| Trichloroacetic acid not used | 1,430 | 0.58 | 130 |

[1] Cps., 1% aqueous solution.

EXAMPLE 7

In a reactor, there are charged 100 parts of purified wood pulp ($\alpha$-cellulose, 95.0%; relative viscosity according to JIS P8101-1961, 10.5) of 90% purity and 400 parts of a mixture of benzene, ethanol and water (50:30:20 by weight), and 40.5 parts of sodium hydroxide are added thereto. The resultant mixture is agitated at 25° C. for 1 hour. Then, 42 parts of monochloroacetic acid are added thereto, and the resulting mixture is agitated at 65° C. for 1 hour so that etherification proceeds. After addition of a certain amount of trichloroacetic acid in solid in about 1 minute, agitation is continued at 65° C. for further 1 hour. The reaction mixture is neutralized with acetic acid, washed with 80% methanol three times and dried.

The physical properties of the thus obtained CMC are shown in Table 6 wherein those of CMC obtained by treatment as above but elevating the temperature after the addition of trichloroacetic acid gradually to 85° C. in 30 minutes, during which the reaction solvent is recovered up to 70%, are also shown.

TABLE 6

| Amount of trichloroacetic acid added[1] | CMC produced without recovery of solvent | | | CMC produced with recovery of solvent | | |
|---|---|---|---|---|---|---|
| | Viscosity[2] | DS | Transparency (mm.) | Viscosity[2] | DS | Transparency (mm.) |
| 0.000 | 860 | 0.60 | 180 | 1,050 | 0.63 | 170 |
| 0.005 | 910 | 0.60 | 180 | 1,320 | 0.61 | 160 |
| 0.010 | 1,250 | 0.59 | 150 | 1,970 | 0.60 | 140 |
| 0.020 | 1,830 | 0.59 | 140 | 2,450 | 0.59 | 120 |
| 0.030 | 1,960 | 0.58 | 120 | 2,860 | 0.59 | 110 |
| 0.050 | 2,060 | 0.57 | 70 | 2,180 | 0.55 | 55 |
| 0.060 | 1,780 | 0.55 | 50 | 1,810 | 0.55 | 50 |
| 0.100 | 1,360 | 0.55 | 30 | 1,540 | 0.55 | 30 |

[1] Mol/anhydroglucose unit of the cellulose molecule.
[2] Cps., 1% aqueous solution.

EXAMPLE 8

In a reactor, 100 parts of purified wood pulp are charged and kept in fluidizing state. After adding 70 parts of 70% aqueous solution of monochloroacetic acid and then 155 parts of 30% aqueous solution of sodium hydroxide thereto in the spray manner, the resultant mixture is mixed up for 60 minutes, during which the temperature is maintained below 30° C. The reaction mixture is treated with 7 parts of 70% aqueous solution of trichloroacetic acid. The reaction product is purified with methanol in a conventional procedure to give pure CMC. For comparison, the same treatment as above but without trichloroacetic acid treatment is carried out. The physical properties of the obtained CMC are shown in Table 7.

TABLE 7

| Property | Viscosity[1] | DS | Transparency (mm.) |
|---|---|---|---|
| Method: | | | |
| Present invention | 1,610 | 0.60 | 130 |
| Trichloroacetic acid not used | 820 | 0.60 | 130 |

[1] Cps., 1% aqueous solution.

What is claimed is:

1. In the production of carboxymethyl cellulose or its alkali salt by etherification of cellulose or alkali cellulose with monochloroacetic acid or its alkali salt in a liquid medium, the improvement which comprises treating said cellulosic material with 0.005 to 0.1 mol of trichloroacetic acid or its alkali salt per anhydroglucose unit of the cellulose molecule prior to, simultaneously with or subsequent to the said etherification to obtain products of high viscosity.

2. The improvement according to claim 1 wherein the etherification is effected in the slurry state in a mixture consisting of water and at least one organic solvent.

3. The improvement according to claim 2 wherein the treatment is effected with 0.01 to 0.05 mol of trichloroacetic acid or its alkali salt per anhydroglucose unit of the cellulose molecule.

4. The improvement according to claim 2 wherein the treatment is effected while removing partly or wholly the liquid medium from the reaction system.

5. The improvement according to claim 3 wherein the treatment is effected while removing partly or wholly the liquid medium from the reaction system.

References Cited

UNITED STATES PATENTS

| 2,758,111 | 8/1956 | Roth | 260—232 |
| 2,921,934 | 1/1960 | Weisberg | 260—232 |
| 3,394,127 | 7/1968 | Sommers | 260—232 |

HOSEA E. TAYLOR, Primary Examiner
R. W. GRIFFIN, Assistant Examiner

U.S. Cl. X.R.
260—232